United States Patent
Tzeng et al.

(10) Patent No.: US 12,422,840 B2
(45) Date of Patent: Sep. 23, 2025

(54) MATERIAL LIFE PREDICTING METHOD

(71) Applicant: Taiwan Power Company, Taipei (TW)

(72) Inventors: Chian-Wei Tzeng, Taipei (TW); Chuan-Sheng Kao, Taipei (TW); Shu-Wei Chang, Taipei (TW)

(73) Assignee: TAIWAN POWER COMPANY, Taipei (TW)

( * ) Notice: Subject to any disclaimer, the term of this patent is extended or adjusted under 35 U.S.C. 154(b) by 454 days.

(21) Appl. No.: 18/092,029

(22) Filed: Dec. 30, 2022

(65) Prior Publication Data
US 2023/0213929 A1    Jul. 6, 2023

(30) Foreign Application Priority Data

Jan. 5, 2022   (TW) .................................. 111100440

(51) Int. Cl.
    *G05B 23/02*    (2006.01)
(52) U.S. Cl.
    CPC .................. *G05B 23/0283* (2013.01)
(58) Field of Classification Search
    CPC ............ G05B 23/0283; G05B 23/0227; G05B 23/0278; G05B 23/0281; G05B 2219/37252; G05B 19/4065; G01N 23/207; G01N 23/22; G01N 27/026; G01N 23/2273; G01N 2223/1016; G01N 2223/076; G01N 2223/0766; G01N 23/2209; G01N 2223/041; G01N 23/223; G01N 23/085; G01N 2223/632; C01P 2002/70; G03F 7/2039; G03C 5/16; G01J 3/0294; G01R 33/4641; C23C 16/484; C12M 1/3476; C01B 33/2869; G06F 2212/7204
    USPC .................................................. 702/182, 183
    See application file for complete search history.

(56) References Cited

U.S. PATENT DOCUMENTS 9,851,342 B2 * 12/2017 Kaneko ............... G01N 33/445
2023/0400847 A1 * 12/2023 Guo .................... G05B 23/0283

* cited by examiner

*Primary Examiner* — Huy Q Phan
*Assistant Examiner* — Martin Walter Braunlich
(74) *Attorney, Agent, or Firm* — Resonance IP Law, PC

(57) ABSTRACT

A material life predicting method is to perform X-ray diffraction on a target to obtain a composition state curve diagram of the target, and then compare the composition state curve diagram of the target according to a built-in data in a database to obtain a composition of the target and content of the composition, and then the content of the identical composition of the target and the control is compared to obtain the change in the content of the identical composition between the target and the control, and then quantify a consumption degree of the material life of the target, where the control is a new furnace tube and the target is a used furnace tube.

8 Claims, 3 Drawing Sheets

MATERIAL LIFE PREDICTING METHOD

BACKGROUND

1. Technical Field

The present disclosure relates to a material life predicting method, and more particularly, to a material life prediction method for predicting the life of a furnace tube of a power generation boiler.

2. Description of Related Art

At present, a furnace temperature is as high as 1100° C. when a power generation boiler of a power plant is running. However, a general measuring device cannot withstand such a high temperature environment, so it is impossible to know the current use status of the power generation boiler related facilities.

Therefore, a current prediction method for measuring the creep damage of pipelines and pipelines in power plants is to install a measuring device in a header section outside the furnace.

However, this kind of measuring method often makes it difficult for maintenance personnel to immediately observe a good or bad condition of a generator set, so it is impossible to predict the degree of consumption of the material life of a furnace tube, resulting in the inability to carry out effective and appropriate response.

Therefore, how to overcome the above-mentioned drawbacks of the prior art has become an urgent problem to be solved at present.

SUMMARY

In view of the various deficiencies of the prior art, the present disclosure provides a material life predicting method, comprising: performing an X-ray diffraction on a target to obtain a composition state curve diagram of the target; comparing the composition state curve diagram of the target according to a built-in data in a database to obtain a composition of the target and content of the composition of the target; performing an X-ray diffraction on a control to obtain a composition state curve diagram of the control; comparing the composition state curve diagram of the control according to the built-in data in the database to obtain a composition of the control and content of the composition of the control, wherein a source of the control is the same as a source of the target, and a use time of the control is different from a use time of the target; comparing the content of at least one identical composition of the target and the control to obtain a change in the content of the identical composition between the target and the control; and quantifying a consumption degree of a material life of the target.

In the aforementioned method, the built-in data is obtained by a Rietveld refinement method.

In the aforementioned method, the built-in data includes a material constitution and a reference curve diagram generated by an X-ray diffraction. For example, the material constitution includes a composition and content of the composition.

In the aforementioned method, the target is a used furnace tube, the control is a new furnace tube (or a non-operating furnace tube), and the use time of the control is less than the use time of the target.

In the aforementioned method, the composition of the target includes iron, molybdenum, chromium and/or carbon.

In the aforementioned method, the composition of the target includes ferrite, cementite, or chromium carbide.

In the aforementioned method, further comprising: fitting the composition state curve diagram of the target to a reference curve diagram of the database; and obtaining a most similar curve trend after fitting the composition state curve diagram of the target to the reference curve diagram of the database, wherein the composition of the target and the content of the composition of the target are known by a material constitution corresponding to a most similar reference curve diagram in the database.

It can be seen from the above that, in the material life predicting method according to the present disclosure, the composition state curve diagram of X-ray diffraction is mainly analyzed by the built-in data, so as to identify the content of the composition of the target and further compare the changes in the content, such that the consumption degree of the material life of the target can be quantified. Therefore, compared with the prior art, the present disclosure can quantify the consumption degree of the material life of the furnace tube of the power plant during operation, so as to predict the material life of the target, so that the maintenance personnel can easily and effectively determine whether the target needs to be replaced.

DETAILED DESCRIPTIONS

The following describes the implementation of the present disclosure with examples. Those skilled in the art can easily understand other advantages and effects of the present disclosure from the contents disclosed in this specification.

It should be understood that, the structures, ratios, sizes, and the like in the accompanying figures are used for illustrative purposes to facilitate the perusal and comprehension of the contents disclosed in the present specification by one skilled in the art, rather than to limit the conditions for practicing the present disclosure. Any modification of the structures, alteration of the ratio relationships, or adjustment of the sizes without affecting the possible effects and achievable proposes should still be deemed as falling within the scope defined by the technical contents disclosed in the present specification. Meanwhile, terms such as "upper," "first," "second" and the like used herein are merely used for clear explanation rather than limiting the practicable scope of the present disclosure, and thus, alterations or adjustments of the relative relationships thereof without essentially altering the technical contents should still be considered in the practicable scope of the present disclosure.

A material life predicting method according to the present disclosure is used to predict a material life value of furnace tubes (such as heat exchange tubes) in a furnace, thereby determining when the furnace tubes need to be replaced.

Figure 1:
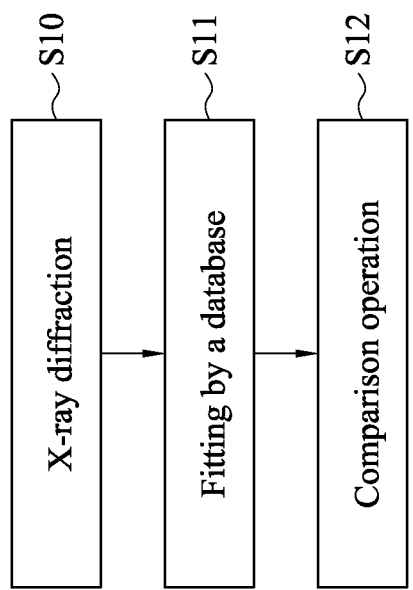
FIG. 1 is a flow chart illustrating steps of a material life predicting method according to the present disclosure.

FIG. 1 is a flow chart illustrating steps of a material life predicting method according to the present disclosure. In an embodiment, an end of a furnace tube (such as a last section) whose life is to be measured is captured as a target, that is, the target is the furnace tube, and its composition is, for example, the material specification of SA-213T91 (that is, a heat-resistant steel containing 9% Cr and 1% Mo) containing iron, molybdenum, chromium and/or carbon, such as ferrite (α-Fe), cementite, chromium carbide ($Cr_{23}C_6$) and vanadium carbide (VC) etc.

The heat-resistant steel containing 9% Cr and 1% Mo, due to the carbon fixation effect of alloying elements, can solve the problem of graphitization caused by the low solubility of carbon atoms between grains. However, when a low-alloy steel is operated under high temperature and high pressure for a long time, the precipitation of a carbide solid solution of cementite will cause the decomposition of martensite, which will continue to produce phase changes and progress toward an interstitial carbide state with lower energy. Furthermore, when the temperature of the material is higher, the carbon atoms in the martensite have a stronger ability to diffuse in the ferrite (α-Fe) grains. The operating temperature of the superheater material at the end of the furnace tube is above 500° C., and the chromium (Cr) atom and the molybdenum (Mo) atom have sufficient diffusivity, resulting in the precipitation of more new phases of cementite from the ferrite (α-Fe) and carbon atoms. The cementite originally in the grains of martensite is dissolved in sequence to form an orthogonal structure of (Fe, Cr, Mo)$_3$C, a triangular structure of (Fe, Cr, Mo)$_7$C$_3$ and a face-centered cubic structure of (Fe, Cr, MO)$_{23}$C$_6$.

Therefore, a life consumption caused by the operation of a steam boiler tube in a high temperature and high pressure environment has a direct relationship with a conversion of the ferrite (α-Fe) into the orthogonal structure of (Fe, Cr, Mo)$_3$C and the face-centered cubic structure of (Fe, Cr, Mo)$_{23}$C$_6$. Therefore, by means of the content of ferrite (α-Fe), cementite or chromium carbide ($Cr_{23}C_6$), a material remaining life of the furnace tubes in the power plant during operation can be quantified. The predicting method is as follows.

Figure 2:
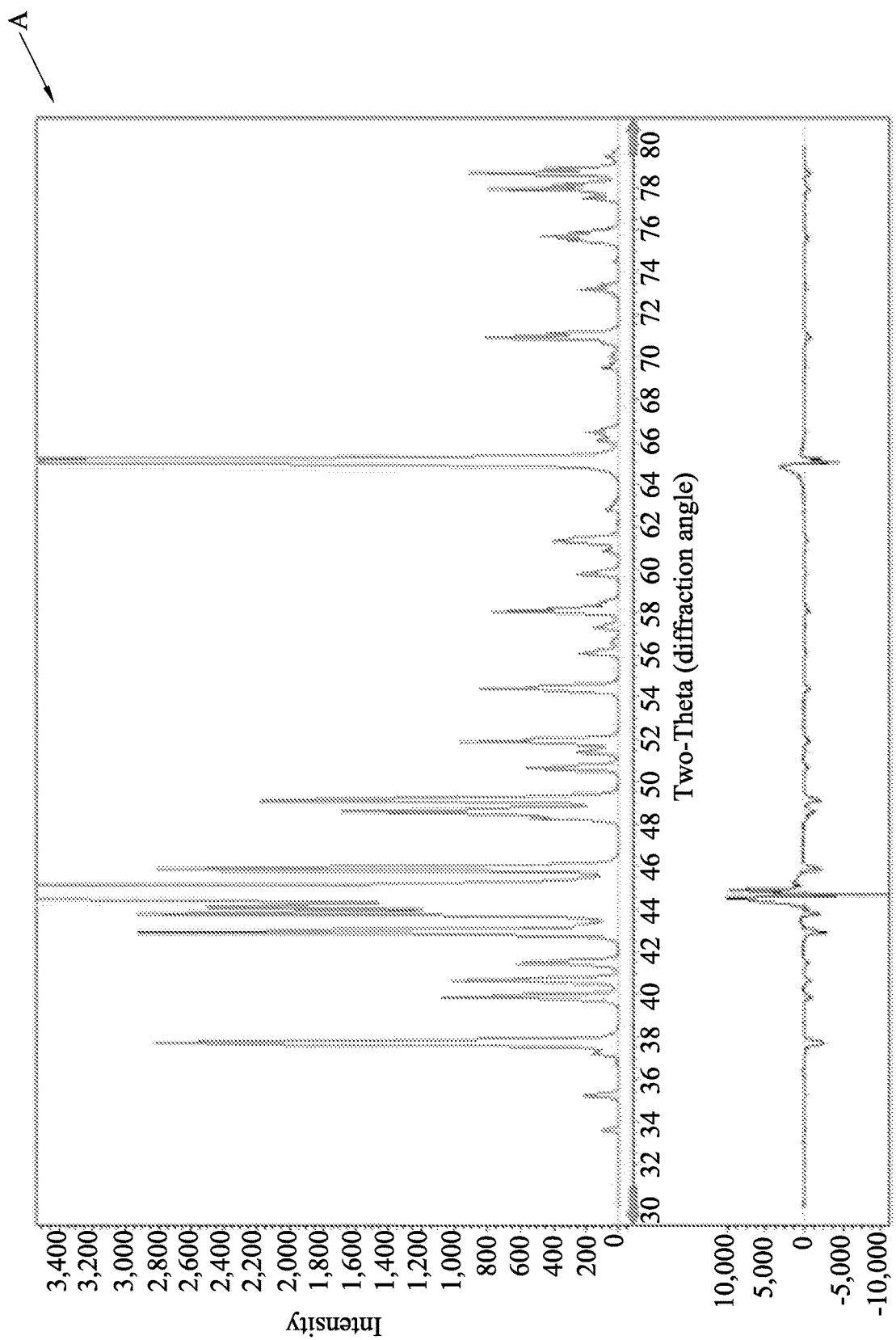
FIG. 2 is a composition state curve diagram obtained in step S10 of FIG. 1.

First, in step S10, the target is subjected to an X-Ray diffraction to obtain a composition state curve diagram A of the target, as shown in FIG. 2.

In an embodiment, the target is, for example, the last section captured from the operating furnace tube after 95,519 hours of use.

Furthermore, a presence of constituent phases in the target (SA-213T91 material) is determined by the X-ray diffraction using a BRUKER X-ray diffractometer and Cu-Kα radiation (wavelength λ=0.154060 microns). For example, the X-ray diffractometer has a scan speed of 0.44°/min and a step size of 0.04° in the 2θ range of 30° to 80°.

Figure 3:
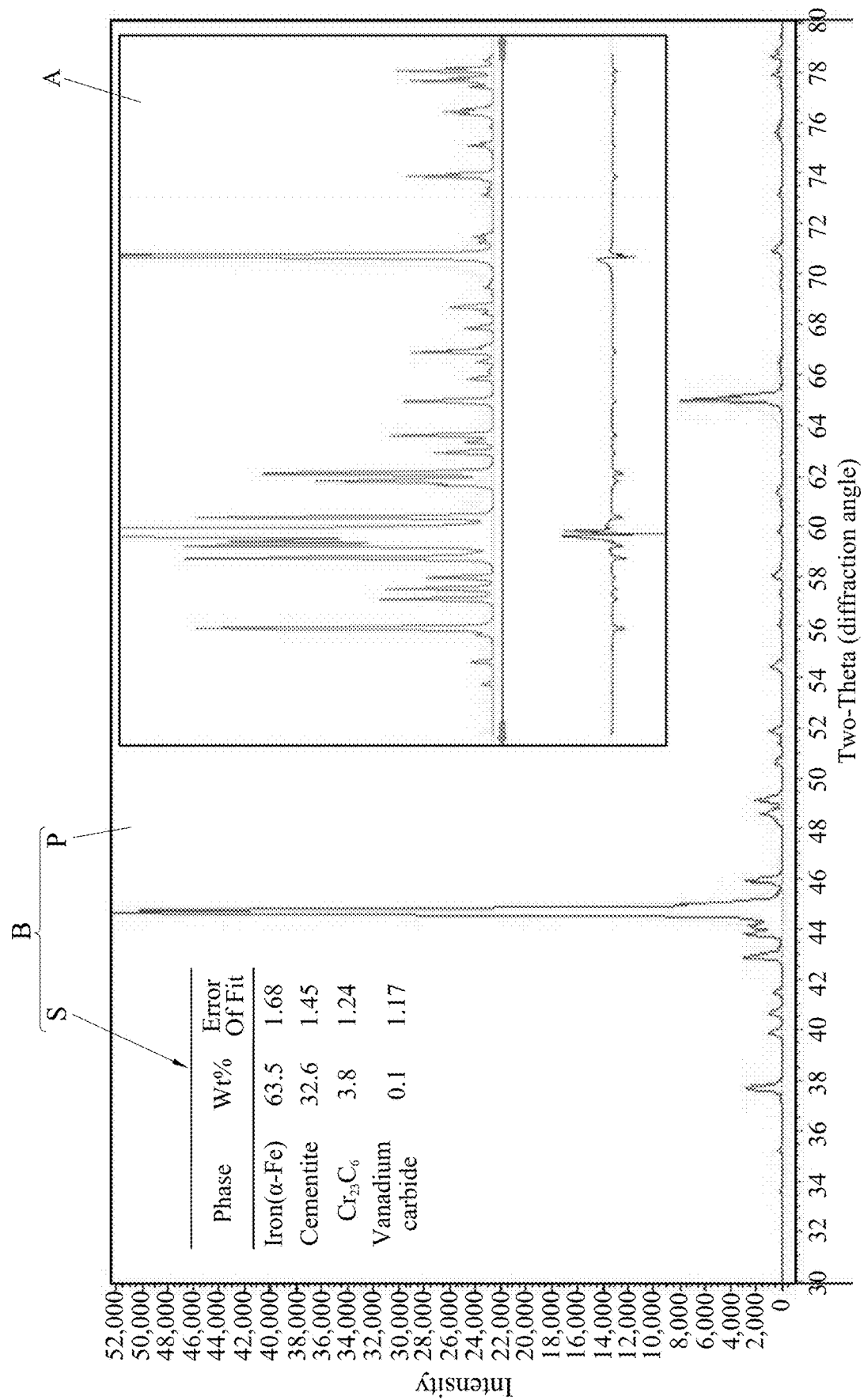
FIG. 3 is a schematic diagram of fitting a built-in data and a component state curve diagram in step S11 of FIG. 1.

In step S11, a composition state curve diagram A of the target is fitted from the built-in data B of a preset database to obtain the composition of the target and the content of the composition, as shown in FIG. 3.

In an embodiment, the built-in data B adopts the Rietveld refinement method to obtain its data content, wherein the Rietveld refinement method can refer to "H. M. Rietveld, A Profile Refinement Method for Nuclear and Magnetic Structures. Journal of Applied Crystallography, vol. 2, pp. 65-'71, 1969." For instance, the Rietveld refinement method shows the curve trend of a material constitution S of various objects, so as to obtain a reference curve diagram P defined by the curve trend generated by X-ray diffraction of various materials in various states, for being used as the built-in data B and stored in the database. Therefore, the composition state curve A of the target (SA-213T91 material) obtained by the X-ray diffraction needs to use the Rietveld refinement method to identify its constitution.

Furthermore, after the composition state curve graph A obtained in step S10 is fitted to the reference curve diagram P of the database, the most similar curve trend can be obtained. Therefore, the composition of the target (SA-213T91 material) and the content of the composition can be known from the material constitution S (including composition and content thereof) corresponding to the most similar reference curve diagram P in the database, as shown in Table 1.

TABLE 1

| Constituent phase | Weight percentage (wt %) | Fitting error |
|---|---|---|
| Ferrite | 63.5 | 1.68 |
| Cementite | 32.6 | 1.45 |
| Chromium carbide ($Cr_{23}C_6$) | 3.8 | 1.24 |
| Vanadium carbide (VC) | 0.1 | 1.17 |

It should be understood that the built-in data B of the database needs to be large enough to ensure that the constitution of the target can be effectively identified. For example, the built-in data B needs to include the reference curve diagram P of the material constitution S of the structure composed of ferrite (α-Fe), cementite, chromium carbide ($Cr_{23}C_6$) and vanadium carbide (VC) in various states.

In step S12, at least one identical composition of the target and a control is compared in content to obtain a change in the content of the identical composition between the target and the control, and then quantify the consumption degree of the material life of the target, wherein a source of the control is the same as a source of the target, and a use time of the control is different from a use time of the target.

In an embodiment, the control is a new SA-213T91 material specification furnace tube or a non-operating furnace tube (the use time of which is less than the use time of the target), and it is performed from step S10 to step S11 to obtain the constitution (including the material and content thereof) corresponding to the most similar reference curve diagram in the database, as shown in Table 2.

TABLE 2

| Constituent phase | Weight percentage (wt %) | Fitting error |
|---|---|---|
| Ferrite | 70.9 | 1.66 |
| Cementite | 25.6 | 1.36 |
| Chromium carbide ($Cr_{23}C_6$) | 3.3 | 1.11 |
| Vanadium carbide (VC) | 0.2 | 1.04 |

As can be seen from Table 1 and Table 2, the phase analysis results in the steel show that the content of the α-Fe phase (ferrite) of the control (new tube) is 70.9 wt. %, while the content of the α-Fe phase of the target (the furnace tube after using 95,519 hours) is 63.5 wt. %. Therefore, the content of the α-Fe is compared as the identical composition, so as to obtain a change of the content of the α-Fe, and then quantify the consumption degree of the material life of the target. For example, if the total life of the material is 400,000 hours, it can be defined that the material life consumption of the control (new tube) is 0% when the content of α-Fe phase is 70.9 wt. %. Therefore, when the content of α-Fe phase is 63.5 wt. %, the material life consumption of the target is 23% (i.e. 95,519 hours/400,000 hours), so that α-Fe in various contents and the value of the material life consumption are made into a table for the on-site personnel to refer to, as shown in Table 3.

TABLE 3

| α-Fe content (wt. %) | Material life consumption (%) |
|---|---|
| 70.9 | 0 |
| 63.5 | 23 |
| 58.6 | 42 |
| 38.7 | 69 |
| 20.6 | 92 |

It can be seen from Table 3 that the on-site personnel only need to know the content of the α-Fe to know the current status of the material life consumption of the furnace tube, so as to determine whether to replace the furnace tube.

Furthermore, under high temperature and high pressure operation for a long time, ferrite (α-Fe) and chromium (Cr) elements form cementite precipitated phase via Oswald ripening effect and segregated carbon atoms. Therefore, the $Fe_3C$ phase (i.e. cementite) content of the control and the target are 25.6 wt. % and 32.6 wt. %, respectively.

In addition, regarding the influence of the weight percentage of vanadium carbide (VC) of the face-centered cubic structure precipitated in a Gap phase on the operation time and the overheating of the material, it can be known from Tables 1-3 that vanadium carbide (VC) is a stable dispersion-strengthened carbide, and the element vanadium (V) migrates from the solid solution state in the grains to the carbides in the combination state in a very small amount. Therefore, it can be seen from Tables 1-3 that when the furnace tube operates for less than 100,000 hours, or even fails due to overheating, there is no correlation between vanadium carbide (VC) and the material life.

Therefore, when selecting the identical composition, the change in the content of vanadium carbide (VC) can be ignored, so that the control and the target can be compared with the change in the content of ferrite, cementite or $Cr_{23}C_6$.

To sum up, the material life predicting method according to the present disclosure mainly uses the Rietveld refinement method to analyze the X-ray diffraction data (such as the composition state curve diagram) to identify the content of the composition of the target (such as the crystal structure of α-Fe, cementite, $Cr_{23}C_6$ and VC) to further compare the change of the content, so that the consumption degree of the material life of the target can be quantified.

Therefore, the material life of the target can be predicted by quantifying the consumption degree of the material life of the furnace tubes of the power plant during operation, so that maintenance personnel (or other users) can easily and effectively determine whether the target needs to be replaced.

It should be understood that the target is not limited to the furnace tube, but can be of various structures, so as to be widely used in the prediction operation of material life.

The foregoing embodiments are provided for the purpose of illustrating the principles and effects of the present disclosure, rather than limiting the present disclosure. Anyone skilled in the art can modify and alter the above embodiments without departing from the spirit and scope of the present disclosure. Therefore, the scope of protection with regard to the present disclosure should be as defined in the accompanying claims listed below.

What is claimed is:

1. A material life predicting method, comprising:
    performing an X-ray diffraction on a target to obtain a composition state curve diagram of the target;
    comparing the composition state curve diagram of the target according to a built-in data in a database to obtain a composition of the target and content of the composition of the target;
    performing an X-ray diffraction on a control to obtain a composition state curve diagram of the control;
    comparing the composition state curve diagram of the control according to the built-in data in the database to obtain a composition of the control and content of the composition of the control, wherein a source of the control is the same as a source of the target, and a use time of the control is different from a use time of the target;
    comparing the content of at least one identical composition of the target and the control to obtain a change in the content of the identical composition between the target and the control; and
    quantifying a consumption degree of a material life of the target.

2. The material life predicting method of claim 1, wherein the built-in data is obtained by a Rietveld refinement method.

3. The material life predicting method of claim 1, wherein the built-in data includes a material constitution and a reference curve diagram generated by an X-ray diffraction.

4. The material life predicting method of claim 3, wherein the material constitution includes a composition and content of the composition.

5. The material life predicting method of claim 1, wherein the target and the control are furnace tubes, and the use time of the control is less than the use time of the target.

6. The material life predicting method of claim 1, wherein the composition of the target includes iron, molybdenum, chromium and/or carbon.

7. The material life predicting method of claim 1, wherein the composition of the target includes ferrite, chromium carbide, or cementite.

8. The material life predicting method of claim 1, further comprising:
    fitting the composition state curve diagram of the target to a reference curve diagram of the database; and
    obtaining a most similar curve trend after fitting the composition state curve diagram of the target to the reference curve diagram of the database, wherein the composition of the target and the content of the composition of the target are known by a material constitution corresponding to a most similar reference curve diagram in the database.

* * * * *